(12) United States Patent
Yun et al.

(10) Patent No.: US 9,815,324 B2
(45) Date of Patent: Nov. 14, 2017

(54) ANTITHEFT NUT

(71) Applicant: Hyundai Motor Company, Seoul (KR)

(72) Inventors: Seok Hwan Yun, Hwaseong-Si (KR); Hyung Seob Kim, Goyang-Si (KR)

(73) Assignee: Hyundai Motor Company, Seoul (KR)

( * ) Notice: Subject to any disclaimer, the term of this patent is extended or adjusted under 35 U.S.C. 154(b) by 68 days.

(21) Appl. No.: 14/939,964

(22) Filed: Nov. 12, 2015

(65) Prior Publication Data

US 2016/0361947 A1    Dec. 15, 2016

(30) Foreign Application Priority Data

Jun. 12, 2015  (KR) .................. 10-2015-0083598

(51) Int. Cl.

| F16B 35/06 | (2006.01) |
|---|---|
| B60B 3/16 | (2006.01) |
| B25B 13/48 | (2006.01) |
| F16B 23/00 | (2006.01) |
| F16B 41/00 | (2006.01) |
| B60B 27/06 | (2006.01) |

(52) U.S. Cl.
CPC ............ *B60B 3/165* (2013.01); *B25B 13/485* (2013.01); *F16B 23/0007* (2013.01); *F16B 23/0061* (2013.01); *F16B 41/005* (2013.01); *B60B 27/065* (2013.01)

(58) Field of Classification Search
CPC ............. F16B 23/0007; F16B 23/003; F16B 23/0038; F16B 23/0053; F16B 35/06; F16B 41/00

USPC .......................................... 411/402, 403, 410
See application file for complete search history.

(56) References Cited

U.S. PATENT DOCUMENTS

| 3,282,145 | A | * | 11/1966 | Prescott | .............. | F16B 23/0007 |
|---|---|---|---|---|---|---|
| | | | | | | 411/403 |
| 3,604,305 | A | * | 9/1971 | Dreger | .................. | F16B 23/003 |
| | | | | | | 411/403 |
| 4,084,478 | A | * | 4/1978 | Simmons | ............... | B21K 1/463 |
| | | | | | | 411/404 |
| 6,024,522 | A | * | 2/2000 | Bainbridge | ............. | F16B 23/00 |
| | | | | | | 411/410 |
| 6,295,900 | B1 | | 10/2001 | Julicher et al. | | |
| 6,609,401 | B1 | | 8/2003 | Iskhakbayev | | |
| 6,997,085 | B2 | * | 2/2006 | Yamamoto | .............. | B25B 13/06 |
| | | | | | | 411/402 |
| 8,992,151 | B2 | * | 3/2015 | Parker | ................. | F16B 23/0046 |
| | | | | | | 411/402 |

(Continued)

FOREIGN PATENT DOCUMENTS

| JP | 3006048 U | 10/1994 |
|---|---|---|
| JP | 2002-317806 A | 10/2002 |

(Continued)

*Primary Examiner* — Roberta Delisle
(74) *Attorney, Agent, or Firm* — Morgan, Lewis & Bockius LLP

(57) ABSTRACT

An antitheft nut may include a virtual reference line extending in a circumferential direction on a basis of a center with respect to one surface of a nut body, a plurality of key assembling portions continuously protruding or depressed along the virtual reference line, and an assembling line having the plurality of key assembling portions repeatedly formed while being spaced apart from each other in an inside direction and an outside direction of the virtual reference line.

5 Claims, 3 Drawing Sheets

(56) References Cited

U.S. PATENT DOCUMENTS

| | | | |
|---|---|---|---|
| 9,004,836 B2* | 4/2015 | Wells | F16B 23/0007 |
| | | | 411/402 |
| 2008/0006126 A1* | 1/2008 | Hsieh | B25B 13/065 |
| | | | 81/121.1 |
| 2013/0213193 A1* | 8/2013 | Lukes | B25B 13/065 |
| | | | 81/436 |

FOREIGN PATENT DOCUMENTS

| | | |
|---|---|---|
| JP | 2003-118301 A | 4/2003 |
| JP | 2014-47814 A | 3/2014 |
| KR | 10-2012-0122118 A | 11/2012 |

* cited by examiner

ANTITHEFT NUT

CROSS-REFERENCE(S) TO RELATED APPLICATIONS

The present application claims priority to Korean Patent Application No. 10-2015-0083598, filed Jun. 12, 2015, the entire contents of which is incorporated herein for all purposes by this reference.

BACKGROUND OF THE INVENTION

Field of the Invention

Various embodiments of the present invention relate to an antitheft nut, and more particularly, to an antitheft nut for preventing a theft of parts at the time of assembling various parts.

Description of Related Art

Recently, with the growing demand for luxury vehicles, expensive equipments are mounted in these vehicles. In particular, expensive wheels/tires are mounted in the vehicles.

To prevent a theft of these expensive vehicle parts, the vehicle makes a warning sound through a door alarm apparatus or a driving of the vehicle stops by limiting an operation of a steering apparatus even though an engine is driven.

However, most of the antitheft means described above are to prevent an access to a vehicle interior and there is no antitheft means for parts exposed outside the vehicle. As a result, there is a limitation in preventing theft accidents to separate and steal external parts.

For example, a general wheel fixing apparatus is configured to rotate together with a vehicle shaft supplied with power of an engine by mounting a hub and a drum at an end of the vehicle shaft and is configured to rotate together with the vehicle shaft by being combined with a wheel by a bolt mounted in the hub and fastening an end of the bolt, which is fitted in the wheel, with a nut to fix the wheel to the hub.

If the wheel fixing apparatus is released by loosening the nut, the tire of the vehicle may be simply disassembled. Therefore, the tire of the vehicle may always get stolen. In particular, the nut fixing the vehicle wheel may be separated by a generally used tool and therefore may be easily separated anywhere.

To solve the above problems, a scheme for applying a special nut which may be loosened only by a special tool to the vehicle wheel has been used. However, even though a shape of the special nut is especially formed, as the special nut is mass-produced, the nut may be easily loosened by the special tool, in the corresponding vehicle model.

Therefore, there is a limitation in preventing the theft of the vehicle by limiting the separation of the nut.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an antitheft nut permitting a separation of nuts only at the time of authentication depending on their unique shapes to separate the nuts, in the nuts fixing various kinds of parts.

According to various aspects of the present invention, an antitheft nut may include a virtual reference line extending in a circumferential direction on a basis of a center with respect to one surface of a nut body, a plurality of key assembling portions continuously protruding or depressed along the virtual reference line, and an assembling line having the plurality of key assembling portions repeatedly formed while being spaced apart from each other in an inside direction and an outside direction of the virtual reference line.

The key assembling portion of the assembling line may include a first key portion formed on the reference line, a second key portion spaced apart from the virtual reference line in the inside direction, and a third key portion spaced apart from the virtual reference line in the outside direction, in which the first key portion, the second key portion, and the third key portion may be formed in a circle by being integrally connected to one another.

The key assembling portion may have the plurality of first key portions, second key portions, and third key portions repeatedly formed, and the first key portion may be positioned between the second key portion and the third key portion or may be positioned between same key portions among the second key portions and the third key portions.

The first key portion of the key assembling portion may be formed in plural in the same shape and the second key portion and the third key portion are formed in plural in at least one different shape.

The first key portion may be positioned to have the reference line penetrating through a center thereof, the second key portion is positioned so that an outer side end thereof contacts the reference line, and the third key portion is positioned so that an inner side end thereof contacts the reference line.

The first key portion, the second key portion, and the third key portion may be formed to make widths of outer side ends wider than those of inner side ends and make both side ends contact one another.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
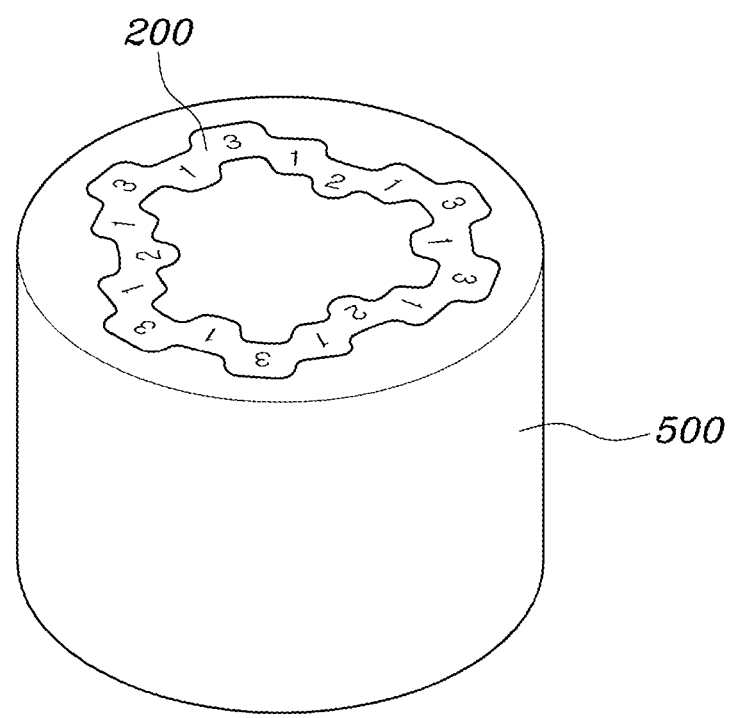
FIG. 1 is a perspective view showing an exemplary antitheft nut according to the present invention.
Figure 2:
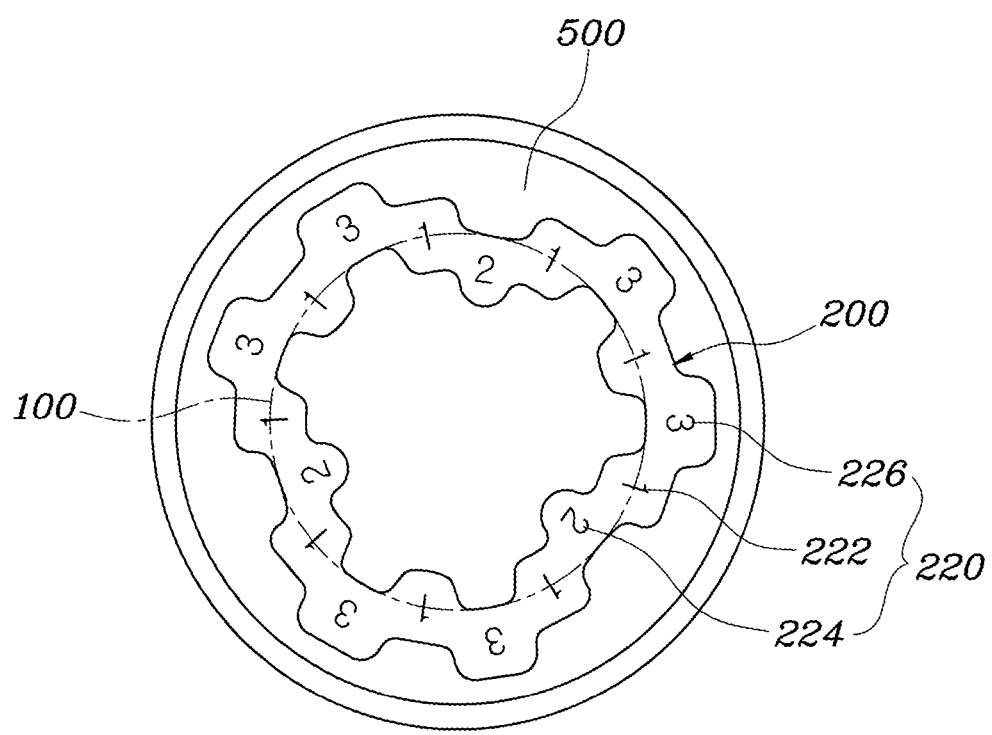
FIG. 2 and FIG. 3 are views for describing the exemplary antitheft nut illustrated in FIG. 1.
Figure 3:
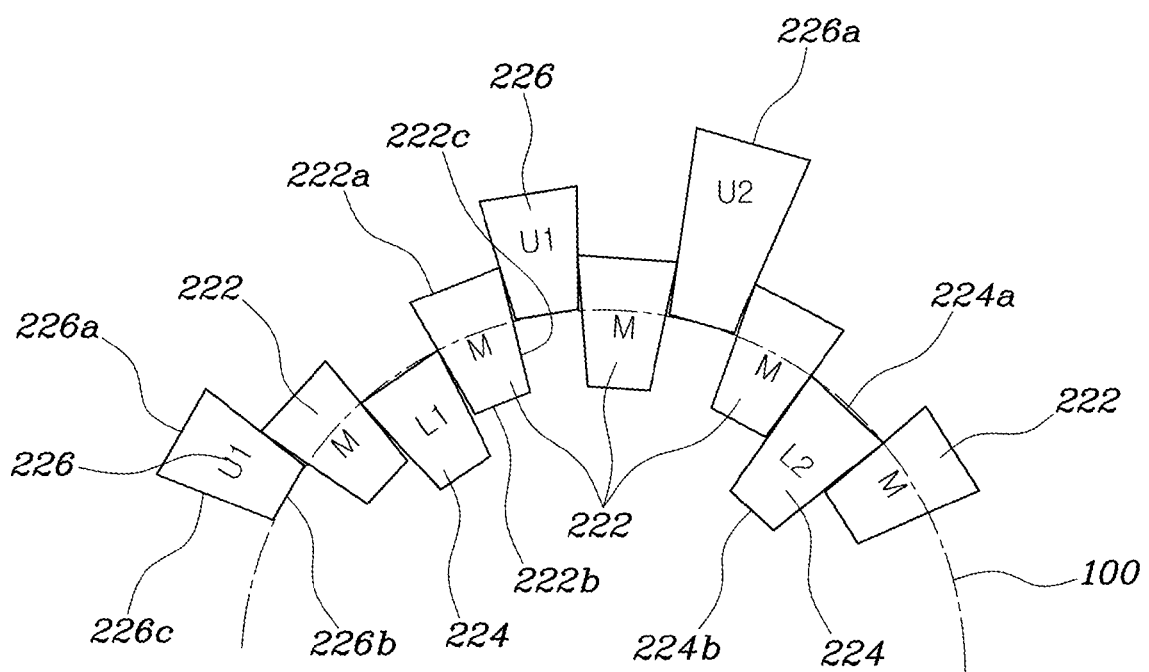

FIG. 1 is a perspective view showing an antitheft nut according to various embodiments of the present invention and FIGS. 2 and 3 are views for describing the antitheft nut illustrated in FIG. 1.

As illustrated in FIGS. 1 and 2, the antitheft nut according to various embodiments of the present invention includes a virtual reference line 100 and an assembling line 200. The virtual reference line 100 is extended in a circumferential direction on the basis of a center with respect to one surface of a nut body 500 and the assembling line 200 includes a plurality of key assembling portions 220 configured to continuously protrude or be depressed along the virtual reference line 100. The plurality of key assembling portions 220 are repeatedly formed while being spaced apart from each other in an inside direction and an outside direction of the virtual reference line 100.

That is, according to various embodiments of the present invention, a groove or a protrusion having an unspecific shape is formed on one surface of the nut body 500 and a nut is loosened only by a specific tool corresponding to the groove or the protrusion having the unspecific shape, thereby preventing a theft of parts fixed by the nut.

In detail, according to various embodiments of the present invention, the virtual reference line 100 is formed on one surface of the nut body 500, the plurality of key assembling portions 220 are positioned around the virtual reference line 100 or are positioned while being spaced from each other in the inside direction or the outside direction of the virtual reference line 100, thereby forming the assembling line 200 having a specific shape. In this configuration, the key assembling portions 220 of the assembling line 200 may protrude in a protrusion shape or may be depressed in the groove shape. In this case, the nut is generally installed to be exposed to the outside and therefore the key assembling portions 220 preferably have the groove shape rather than the protrusion shape so that the specific shape is not easily deformed by an external impact.

Describing in detail the various embodiments of the present invention with reference to the drawings, as illustrated in FIG. 2, the key assembling portions 220 of the assembling line 200 includes a first key portion 222 formed on the reference line; a second key portion 224 configured to be spaced apart from the virtual reference line 100 in the inside direction, and a third key portion 226 configured to be spaced apart from the virtual reference line 100 in the outside direction, in which the first key portion 222, the second key portion 224, and the third key portion 226 may be formed in a circle by being integrally connected to one another.

That is, the key assembling portion is configured to include the first key portion 222, the second key portion 224, and the third key portion 226, in which based on the reference line 100, the first key portion 222 is formed on the virtual reference line 100 and the second key portion 224 and the third key portion 226 are positioned at an inner side or an outer side of the reference line 100. As such, all of the first key portions 222, the second key portions 224, and the third key portions 226 which are formed in plural has differently positions at the reference line and therefore the nut may have the unspecific shape depending on the positions of each key portion. In particular, when the positions of the first key portion 222, the second key portion 224, and the third key portion 226 are determined, these positions are stored the unique shape of the corresponding nut and the fastening of the nut may be loosened only by the specific tool corresponding to the corresponding unique shape.

Meanwhile, as illustrated in FIGS. 2 to 3, the first key portion 222 may be positioned to have the reference line 100 penetrating through the center thereof, the second key portion 224 may be positioned so that an outer side end 224a contacts the reference line 100, and the third key portion 226 may be positioned so that an inner side end 226b contacts the reference line 100.

That is, the first key portion 222 is positioned to have the reference line 100 penetrating therethrough and thus is formed on the reference line 100, the second key portion 224 is positioned so that the outer side end 224a contacts the reference line 100 and thus the second key portion 224 is positioned more inwardly than the first key portion 222, and the third key portion 226 is positioned so that the inner side end 226b contacts the reference line 110 and thus the third key portion 226 is positioned more outwardly than the first key portion 222. As such, based on the reference line 100, the first key portion 222, the second key portion 224, and the third key portion 226 contact the reference line 100, and thus the respective key portions are integrally connected to one another without being disconnected to keep a circle.

Further, even though the sizes of the second key portion 224 and the third key portion 226 to be described below are changed, the second key portion 224 and the third key portion 226 are positioned to contact the reference line 100 and therefore the first key portion 222, the second key portion 224, and the third key portion 226 all may be kept in the state in which they contact one another.

Meanwhile, the key assembling portion 220 includes the plurality of first key portions 222, second key portions 224, and third key portions 226 which are repeatedly formed, in which the first key portion 222 is positioned between the second key portion 224 and the third key portion 226 or is positioned between the same key portions among the second key portions 224 and the third key portions 226.

That is, as illustrated in FIG. 2, the first key portion 222 is positioned between the second key portion 224 and the third key portion 226, between the second key portions, or between the third key portions 226 so that the second key portion 224 and the third key portion 226 do not contact each other.

As such, the positions of the second portion 224 and the third key portion 226 may be differentiated based on the first key portion 222 formed on the reference line 100. In particular, as the second key portion 224 and the third key portion 226 are spaced apart from each other in an opposite to each other on the reference line 100, when the second key portion 224 and the third key portion 226 contact each other, the connection between the respective key portions is disconnected and thus the respective key portions may not be formed in a circle. Here, when the assembling line 200 is not formed in a circle, a force is locally applied to a specific portion of the assembling line 200 at the time of applying a high torque in response to the fastening or unfastening of the nut and thus the key assembling portion 220 may be damaged. For this reason, each of the key portions of the key assembling portion 220 is preferably formed in a circle by being integrally connected to one another.

Further, when the same key portion is continuously formed, as each key portion is not differentiated, errors in the specific shape assigned with the unique number may occur and thus errors due to the use of the specific tool may occur.

Therefore, the first key portion 222 is positioned between the second key portion 224 and the third key portion 226, between the same second key portions 224, or between the same third key portions 226 to certainly differentiate the specific shape.

Meanwhile, the first key portion 222 of the key assembling portion 220 is formed in plural in the same shape and the second key portion 224 and the third key portion 226 may be formed in plural in at least one different shape.

As illustrated in FIG. 3, the first key portion 222 is positioned between the second key portion 224 and the third key portion 226 or between the same key portions and therefore is formed in one shape having the same size, thereby clearly differentiating between the respective key portions. The second key portion 224 and the third key portion 226 are positioned to be spaced apart from each other in the inside direction or the outside direction on the reference line 100 and thus are configured in at least one different shapes, thereby mover variously forming the shape of the assembling line 200.

For example, the first key portion 222 has the same shape and the second key portion 224 and the third key portion 226 have the same shape as the first key portion 222 or the has a shape larger than that of the first key portion 222, and thus the overall specific shape of the key assembling portion 220 is more diverse, thereby more diversifying the unique number meeting the specific shape. As such, as the shape of the key assembling portion 220 is diverse, the common use of the tool for unfastening the nut is low, thereby more improving the antitheft efficiency.

Meanwhile, the first key portion 222, the second key portion 224, and the third key portion 226 are formed to make the widths of the outer side ends 222a, 224a, and 226a of each key portion wider than those of the inner side ends 222b, 224b, and 226b of each key portion and make both side ends 222c, 224c, and 226c contact one another.

That is, as illustrated in FIG. 3, the first key portion 222, the second key portion 224, and the third key portion 226 may be formed in a parallelogram shape as the width of the outer side end is formed to be wider than that of the inner side end. As a result, when both side ends of the first key portion 222, the second key portion 224, and the third key portion 226 each contact each other, the first key portion 222, the second key portion 224, and the third key portion 226 are formed in a circle and thus may be formed in a circle along the circumferential direction of the reference line 100.

According to the antitheft nut having the structure as described above, the specific key shape is formed in the nut and the key shape is assigned with the unique number, thereby separating the nut only by the tool corresponding to the key shape.

In particular, the first key portion 222, the second key portion 224, and the third key portion 226 which configure the key assembling portion 220 of the assembling line 200 formed in the nut each have the specific shape, and as the shape is assigned with the unique number, the production management for each shape is easily performed by the unique number meeting the shape of the key assembling portion 220.

Further, only the pattern of the key assembling portion 220 is machined by one mold and thus manufacturing costs are saved.

As such, the key shape of the nut is diverse and the nut is loosened by only the tool managed by the unique number meeting the key shape, thereby preventing the theft of parts assembled by the nut.

According to the antitheft nut having the structure as described above, the specific key shape is formed in the nut and the key shape is assigned with the unique number, thereby separating the nut only by the tool corresponding to the key shape.

As such, the key shape of the nut is diverse and the nut is loosened by only the tool managed by the unique number meeting the key shape, thereby preventing the theft of parts assembled by the nut.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An antitheft nut, comprising:
   a virtual reference line extending in a circumferential direction on a basis of a center with respect to one surface of a nut body;
   a plurality of key assembling portions continuously protruding or depressed along the virtual reference line; and
   an assembling line having the plurality of key assembling portions repeatedly formed while being spaced apart from each other in an inside direction and an outside direction of the virtual reference line,
   wherein the key assembling portion of the assembling line includes:
   a first key portion formed on the reference line;
   a second key portion spaced apart from the virtual reference line in the inside direction; and
   a third key portion spaced apart from the virtual reference line in the outside direction,
   wherein the first key portion, the second key portion, and the third key portion are formed in a circle by being integrally connected to one another.

2. The antitheft nut of claim 1, wherein the key assembling portion has the plurality of first key portions, second key portions, and third key portions repeatedly formed, and the first key portion is positioned between the second key portion and the third key portion or is positioned between same key portions among the second key portions and the third key portions.

3. The antitheft nut of claim 1, wherein the first key portion of the key assembling portion is formed in plural in the same shape and the second key portion and the third key portion are formed in plural in at least one different shape.

4. The antitheft nut of claim 1, wherein the first key portion is positioned to have the reference line penetrating through a center thereof, the second key portion is positioned so that an outer side end thereof contacts the reference line, and the third key portion is positioned so that an inner side end thereof contacts the reference line.

5. The antitheft nut of claim 1, wherein the first key portion, the second key portion, and the third key portion are formed to make widths of outer side ends wider than those of inner side ends and make both side ends contact one another.

* * * * *